(12) United States Patent
Jaber et al.

(10) Patent No.: US 10,829,208 B2
(45) Date of Patent: Nov. 10, 2020

(54) AIRCRAFT WHEEL WITH A SEPARABLE BEARING BOX

(71) Applicant: SAFRAN LANDING SYSTEMS, Velizy Villacoublay (FR)

(72) Inventors: Sylvain Jaber, Velizy-Villacoublay (FR); Vincent Bellenger, Velizy-Villacoublay (FR); Nicolas Moretti, Velizy-Villacoublay (FR); Gilles Eluard, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 451 days.

(21) Appl. No.: 15/685,019

(22) Filed: Aug. 24, 2017

(65) Prior Publication Data
US 2018/0057151 A1 Mar. 1, 2018

(30) Foreign Application Priority Data
Aug. 24, 2016 (FR) ...................................... 16 57907

(51) Int. Cl.
*B64C 25/36* (2006.01)
*F16C 25/06* (2006.01)
(Continued)

(52) U.S. Cl.
CPC .......... *B64C 25/36* (2013.01); *B60B 27/0078* (2013.01); *B60B 27/04* (2013.01);
(Continued)

(58) Field of Classification Search
CPC ..... B64C 25/36; B64C 25/405; B60B 27/001; B60B 27/0078; B60B 27/06
See application file for complete search history.

(56) References Cited

U.S. PATENT DOCUMENTS 2,613,892 A 10/1952 Dever
5,655,845 A * 8/1997 Lampart ............... F16C 35/047
384/480
(Continued)

FOREIGN PATENT DOCUMENTS

EP 0 687 826 A1 12/1995
EP 2 394 912 A 12/2011
FR 1 155 836 A 5/1958

OTHER PUBLICATIONS

French Preliminary Search Report for 16 57907, dated Mar. 9, 2017.
French Written Opinion for 16 57907, dated Aug. 24, 2016.

*Primary Examiner* — Nicholas McFall
(74) *Attorney, Agent, or Firm* — Sughrue Mion, PLLC

(57) ABSTRACT

An aircraft wheel comprising a hub for mounting the wheel on a landing gear axle for rotation, and a rim with edge flanges for receiving a tire, the rim being secured to the hub by a web. The hub receives releasably a bearing box comprising two bearings, each having an inner and an outer ring mounted between a bushing for engaging on the axle with an outside wall shaped to receive the inner rings, the bushing having one end shaped as an abutment and another end shaped to receive a pre-loading nut. A sleeve extends around the bushing and has (1) an inside wall with shoulders to hold the outer rings axially and (2) an outer wall shaped to be received as a sliding fit in a bearing of the hub, with one end shaped as an abutment and another end shaped to receive a stop nut.

7 Claims, 4 Drawing Sheets

(51) Int. Cl.
*F16C 35/073* (2006.01)
*F16C 19/54* (2006.01)
*B64C 25/40* (2006.01)
*F16C 35/077* (2006.01)
*B60B 27/00* (2006.01)
*B60B 27/04* (2006.01)
*B60K 7/00* (2006.01)
*F16C 19/36* (2006.01)

(52) U.S. Cl.
CPC .......... *B60K 7/0007* (2013.01); *B64C 25/405* (2013.01); *F16C 19/548* (2013.01); *F16C 25/06* (2013.01); *F16C 35/073* (2013.01); *F16C 35/077* (2013.01); *B60B 27/001* (2013.01); *F16C 19/364* (2013.01); *F16C 2226/60* (2013.01); *F16C 2326/02* (2013.01); *F16C 2326/43* (2013.01)

(56) References Cited

U.S. PATENT DOCUMENTS

2011/0304292 A1 12/2011 Charuel et al.
2016/0031259 A1 2/2016 Champion

* cited by examiner

AIRCRAFT WHEEL WITH A SEPARABLE BEARING BOX

The invention relates to an aircraft wheel with a separable bearing box.

BACKGROUND OF THE INVENTION

Aircraft wheels are known that have both a hub receiving bearings for mounting the wheel to rotate on a landing gear axle, and also a rim with side flanges for receiving a tire, the rim being secured to the hub by a web. The wheel may be made up of two half-wheels that are secured to each other via the web by means of assembly bolts, or on the contrary it may comprise a single piece, in which case one of the flanges is removable in order to mount the tire.

Such wheels are held on the axle by means of an end nut, which on being tightened, serves to pre-load bearings that are mounted around the axle. Each of the wheels needs to be replaced on a regular basis because of progressive wear to the tire, typically once every two hundred flights. A maintenance crew jacks up the landing gear, removes the axle nut, and removes the wheel in order to replace it with a wheel having a tire that is new or retreaded. The wheel that has been removed then goes to a maintenance workshop where it is disassembled in order to remove the worn tire so as to replace it. This disassembly is also used for inspecting the bearings, for greasing them, and possibly for replacing them if they have reached the end of their prescribed lifetime.

Recently, "long duration" tires have appeared that make it possible to have a much larger number of flights between two wheel changes. Such tires raise the question of inspecting the bearings, which under present maintenance programs need to be inspected at a frequency that is much more frequent than changing such tires.

OBJECT OF THE INVENTION

The invention seeks to propose an aircraft wheel that facilitates inspecting, maintaining, or changing its bearings.

SUMMARY OF THE INVENTION

In order to achieve this object, there is proposed an aircraft wheel comprising a hub for mounting the wheel on a landing gear axle to enable the wheel to rotate about an axis of rotation, and a rim with edge flanges for receiving a tire, the rim being secured to the hub by a web, wherein, according to the invention, the hub is adapted to receive releasably a bearing box comprising:

two conical roller bearings each having an inner ring and an outer ring mounted between:
a bushing for engaging on the axle with an outside wall shaped to receive the inner rings of the bearings, the bushing having one end shaped as an abutment and another end shaped to receive a pre-loading nut; and
a sleeve extending around the bushing and having an inside wall presenting two shoulders to hold the outer rings of the bearings axially, the sleeve having an outer wall shaped to be received as a sliding fit in a bearing of the hub, with one end shaped as an abutment and another end shaped to receive a stop nut.

As a result, the wheel can be mounted like a conventional wheel on the axle, the axle nut then serving to stop the bushing of the bearing box axially on the axle. During a maintenance operation, the wheel is removed from the axle by unscrewing the axle nut, and the box is separated from the remainder of the wheel by unscrewing the stop nut in order to replace it with another box containing bearings that have been inspected and greased, which operation can be performed directly on the tarmac. The wheel is then put back on the aircraft, and the box that has been removed is taken away for inspecting and greasing the bearings.

By means of the wheel of the invention, it is thus possible to have different frequencies for inspecting and maintaining the bearings and for replacing the tire.

Furthermore, the presence of a sleeve guided by the bearings of the wheel makes it possible to couple all kinds of elements thereto, such as the blades of a fan or the target of a rotation sensor, such as a Hall effect tachometer.

In addition, the presence of the bushing and of the sleeve make it easy to fit the wheel with a motor, by fitting a motor on the box, with the stator of the motor being secured to the bushing and its rotor being secured to the sleeve.

In a particular embodiment, the motor does not have any bearings between the rotor and the stator, these two elements being guided in rotation by the bearings in the box.

BRIEF DESCRIPTION OF THE DRAWINGS

The invention can be better understood in the light of the following description of particular embodiments of the invention, given with reference to the figures of the accompanying drawings, in which.

DETAILED DESCRIPTION OF THE INVENTION

Figure 1:
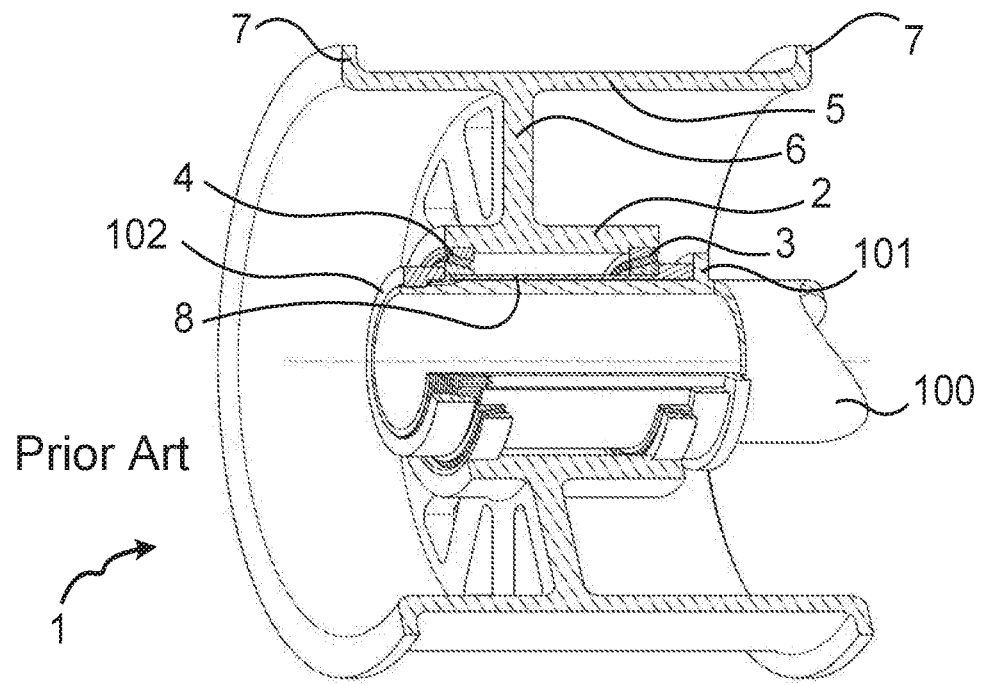
FIG. 1 is a perspective view in section of a conventional aircraft wheel mounted on a landing gear axle.

A conventional aircraft wheel 1 as shown in FIG. 1 comprises a hub 2 that, in this example, receives the outer rings of conical roller bearings 3 and 4. The hub 2 is connected to a rim 5 by means of a perforated web 6. The rim 5 has flanges 7 that retain the flanks of a tire (not shown), one of the flanges being removable in order to receive the tire. The inner rings of the bearings 3 and 4 are received on an axle protector 8 in the form of a bushing, having one end shaped as an abutment to bear against a shoulder 101 on a landing gear axle 100 on which the axle protector 8 is engaged. An axle nut 102 screwed onto the end of the axle 100 serves to pre-load the bearings 3 and 4 and hold the wheel axially on the axle, which wheel then rotates about the axis of rotation defined by the axle and the bearing. When replacing the wheel, it suffices to undo the axle nut 102, to remove the wheel assembly and to replace it with a wheel having a tire that is new or retreaded, and having bearings that have been inspected and greased.

Figure 2:
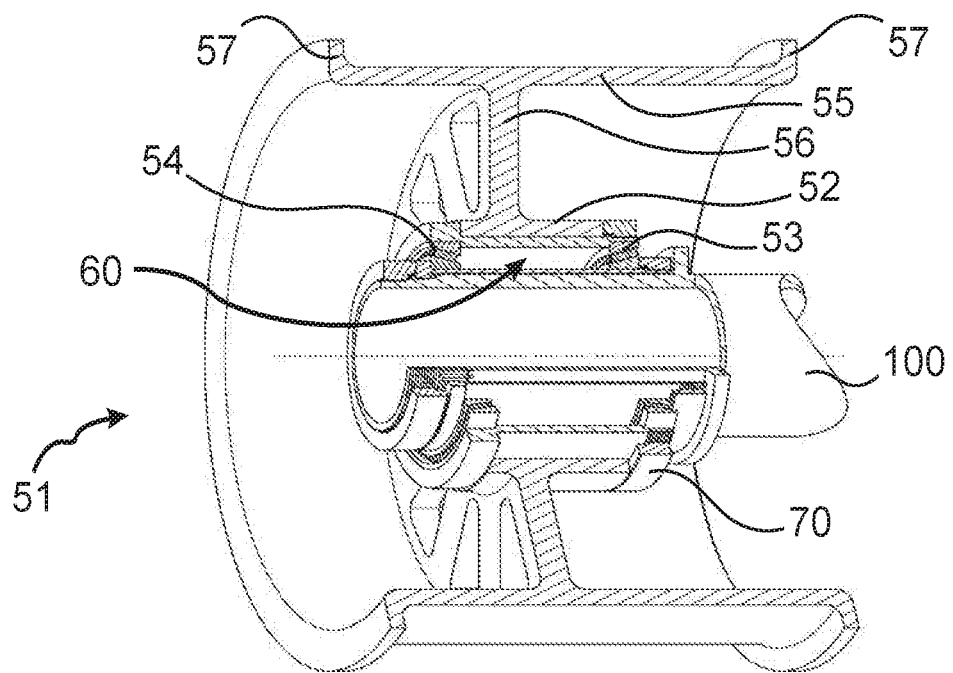
FIG. 2 is a perspective view in section of an aircraft wheel in a particular embodiment of the invention.
Figure 3:
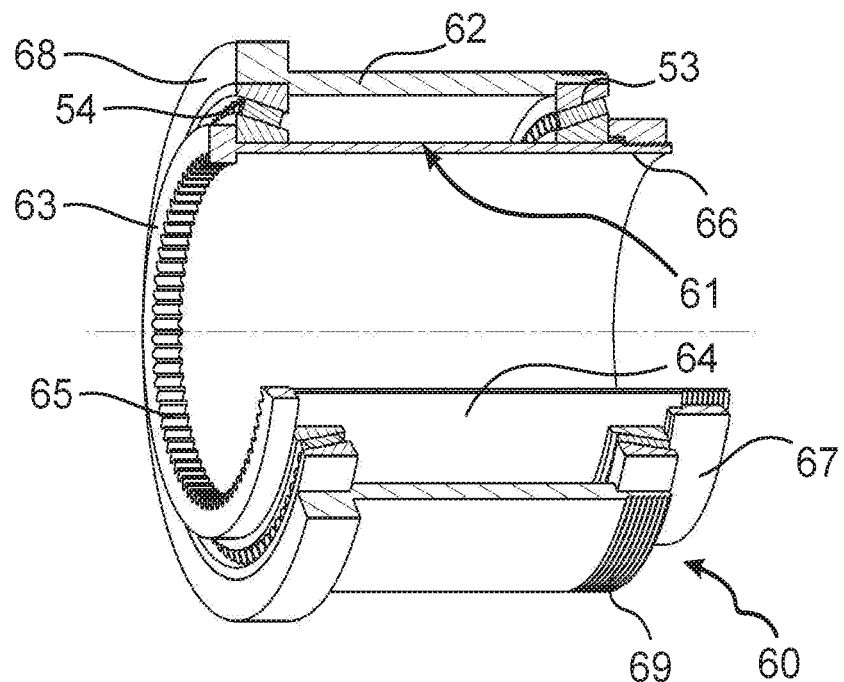
FIG. 3 is an enlarged view of the bearing box fitted to the wheel of FIG. 2.

The invention proposes a wheel with a hub that is separable, such as the wheel 51 shown in FIG. 2. Such a wheel still comprises a rim 55 provided with flanges 57 and connected by a web 56 to a hub 52. Nevertheless, the hub does not receive the conical roller bearings 53, 54. In the invention, the hub 52 is fitted on a bearing box 60 that is shown in greater detail in FIG. 3 and that includes a bushing 61 that is engaged on the axle 100, and a sleeve 62 having an outside face on which the hub 52 is fitted. The bearings 53, 54 extend between the bushing 61 that receives the inner rings of the bearings, and the sleeve 62 that receives the outer rings of the bearings.

For this purpose, the sleeve 62 has ends shaped as housings with shoulders forming abutments for receiving the outer rings of the bearings 53, 54. The bushing 61 has one end 63 shaped so as to project both ways from a thin-walled tubular portion 64. The portion of the end 63 that projects towards the bearings forms an abutment for the bearings, whereas the portion of the end 63 that projects towards the axle 100 includes fluting 65 to co-operate with complementary fluting on the axle 100 so as to prevent the bushing 61 from rotating relative to the axle 100. The other end 66 of the bushing 61 is threaded to receive a pre-loading nut 67 for pre-loading the bearings.

The outer wall of the sleeve 62 is received as a sliding fit in the bore of the hub 52. One end 68 of the sleeve 62 forms an external step to constitute an axial abutment of the sleeve 62, and the other end 69 is threaded to receive a stop nut 70, which can be seen in FIG. 2.

During an operation of inspecting the bearings while the tire carried by the wheel is still good for several more flights, it suffices to remove the wheel, to extract the bearing box therefrom and to replace it with a box in which the bearings have been inspected and greased, and then to reinstall the wheel. The operation can be carried out easily on the tarmac, removing the box from the wheel requiring only the stop nut 70 to be unscrewed.

Thus, the wheel of the invention is taken to the workshop in order to change the tire, with the inspection, maintenance, and bearing-replacement cycle being decorrelated from the tire cycle.

Figure 4:
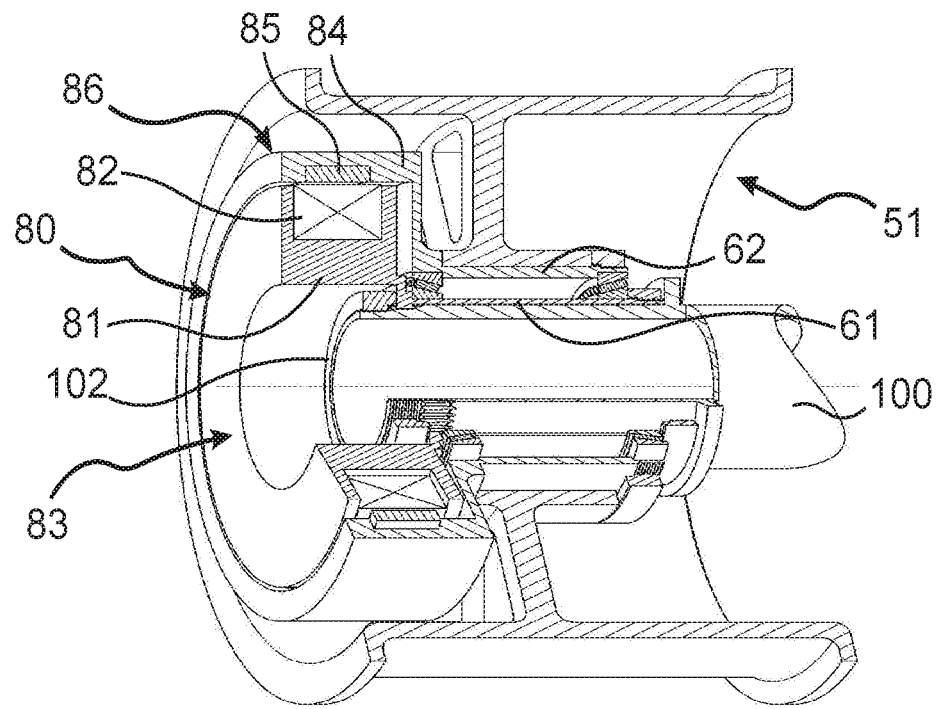
FIGS. 4 to 6 are views similar to the view of FIG. 2 showing variant embodiments in which the bearing box is motor driven.
Figure 5:
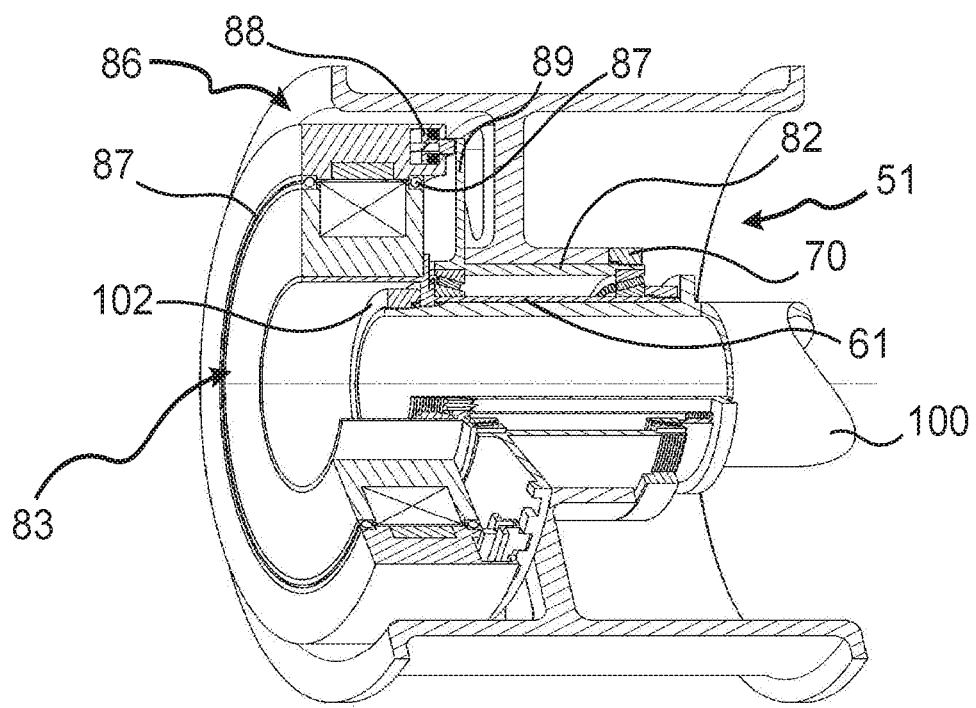
Figure 6:
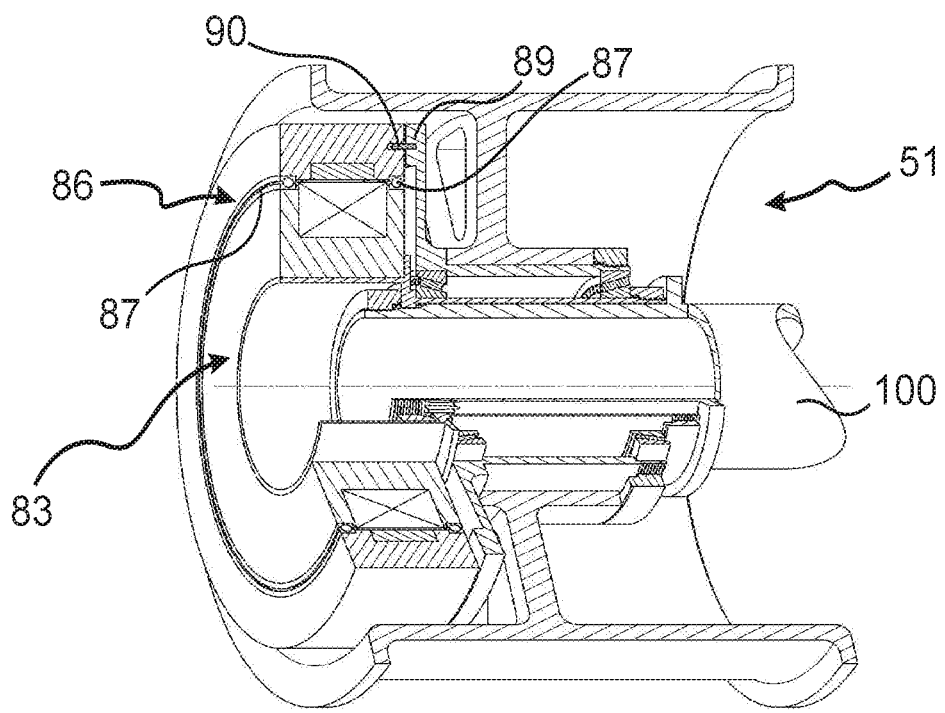

The presence of a box makes it easy to provide the wheel with the motor. Specifically, as shown in FIGS. 4 to 6, it suffices to secure the stator of a motor to the bushing 61 and its rotor to the sleeve 62 in order to be able to cause the sleeve to turn relative to the bushing, and thereby drive the wheel in rotation. Naturally, it is appropriate to make provision for means for constraining the hub and the sleeve together in rotation (not shown), e.g. of the type comprising fluting or pegs.

As shown in FIG. 4, a motor 80 is constituted firstly by an extension 81 of the bushing 61 that extends to receive a winding 82 and form a stator 83 of the motor, and secondly by an extension 84 of the sleeve 62 that extends facing the stator in order to carry permanent magnets 85 and form a rotor 86 of the motor. It should be observed that there is no bearing between the stator and the rotor of the motor, with guidance in rotation being provided by the bearings in the bearing box 60. It should also be observed that the stator is shaped to be capable of passing a tool for tightening the axle nut 102.

In a variant shown in FIG. 5, the rotor 86 is no longer directly secured to the sleeve, but is rotatably mounted on the stator 83 via bearings 87. The rotor 86 is selectively coupled in rotation with the sleeve by means of a dog 88 carried by a disk 89 forming an extension of the sleeve 62.

In a variant shown in FIG. 6, the rotor 83 is now connected to the disk 89 by means of pegs 90 (only one of which can be seen) that are calibrated to give way when the torque being transmitted between the disk 89 and the rotor 83 exceeds a predetermined threshold.

In all of these motorized variants, the bearing box 60 can still be separated easily from the remainder of the wheel by unscrewing the stop nut 70.

In a particular aspect of the invention, it should also be observed that the bearing box 60 in this example is shaped to make it possible, instead of mounting a wheel of the invention, to mount a conventional prior art wheel, such as the wheel shown in FIG. 1, on the same axle and without any modification or adaptation of the axle. This enables a wheel of the invention to be replaced with a conventional wheel should that be necessary in service. In this respect, it should be observed that the bearings of the bearing box 60 are identical and are placed in the same positions as the bearings of a conventional wheel, so that they bear in identical manner on the axle and transmit the same forces. It is then possible merely to select an appropriate axle nut or to interpose a spacer between the nut and the bearing of a conventional wheel, for the purpose of compensating the thickness of the abutment on the bushing, which is not present in a conventional wheel.

Figure 7:
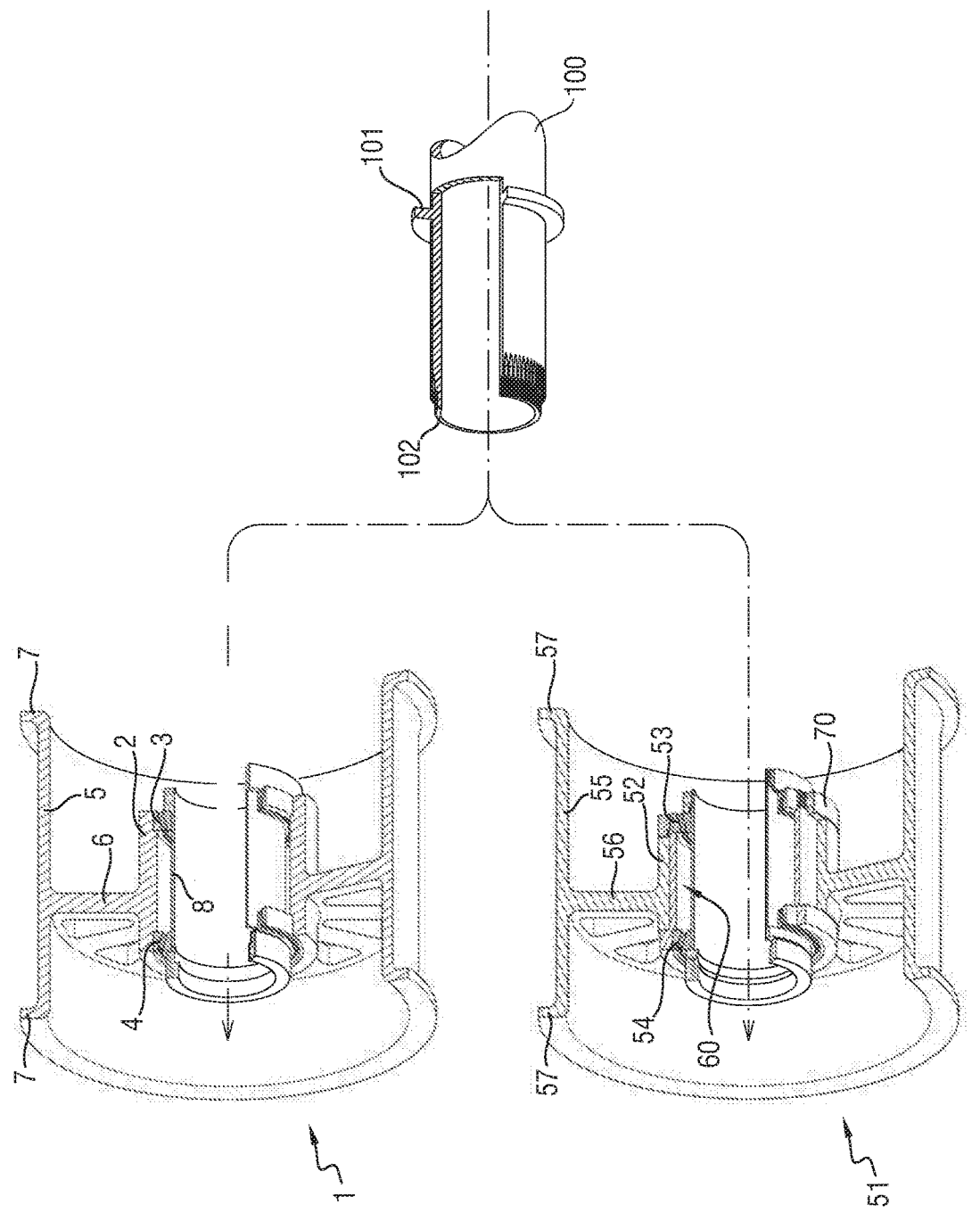
FIG. 7 is an illustration of a hub having two wheels, a first as shown in FIG. 1 and a second as shown in FIG. 2.

Thus, as illustrated in FIG. 7, a set comprising landing gear having at least one axle (100) provided with an axle nut (102), and a selection of wheels suitable for mounting on the axle. The selection can include a wheel (1) as illustrated in FIG. 1, having a hub that receives directly the bearings for rotatably mounting it on the axle (100), such that the bearings are engaged on the axle and are stopped axially and pre-loaded by the axle nut. The set also can include a wheel (51) as illustrated in FIG. 2, in which the bearing box is engaged on the axle and is held axially by the axle nut, both wheels having the same bearings, in arrangements that are identical.

The invention is not limited to the above description, but on the contrary covers any variant coming within the ambit defined by the claims.

In particular, although it is stated that the bushing is fluted to constrain it in rotation on the axle, this provision is optional, and is genuinely necessary only if the sleeve has a motor, which needs to have its stator prevented from moving in rotation.

Although the bearing boxes are shown herein as being provided with motors, with extensions of the bushing or of the sleeve forming the stator, the rotor, or the disk for coupling to a rotor, these elements may be made integrally with the bushing or with the sleeve, or indeed they merely be fitted thereto.

These boxes could equally well be fitted with members other than motors, such as a fan for cooling brake disks through the web of the wheel, or a sensor for sensing the speed of rotation of the wheel.

The invention claimed is:

1. An aircraft wheel comprising a hub, a bearing box for mounting the wheel on a landing gear axle to enable the wheel to rotate about an axis of rotation, the hub being adapted to releasably receive the bearing box, and a rim with edge flanges for receiving a tire, the rim being secured to the hub by a web, the wheel being characterized in that the bearing box comprises:
   two conical roller bearings each having an inner ring and an outer ring mounted between:
   a bushing for engaging on the axle with an outside wall shaped to receive the inner rings of the bearings, the bushing having one end shaped as an abutment and another end shaped to receive a pre-loading nut; and
   a sleeve extending around the bushing and having an inside wall presenting two shoulders to hold the outer rings of the bearings axially, the sleeve having an outer wall shaped to be received as a sliding fit in a bearing of the hub, with one end shaped as an abutment and another end shaped to receive a stop nut.

2. The aircraft wheel according to claim 1, wherein the bushing includes an anti-rotation device adapted for co-operating with a complementary device of the axle in order to prevent the bushing from rotating relative to the axle.

3. The aircraft wheel according to claim 2, wherein the anti-rotation device comprise fluting carried by the end of the bushing that is shaped as an abutment for the bearings.

4. The aircraft wheel according to claim 1, wherein the bearing box is fitted with a motor to cause the sleeve to rotate relative to the bushing.

5. The aircraft wheel according to claim 4, wherein the motor comprises a stator secured to the bushing, and a rotor secured to the sleeve, the rotor and the stator being guided in rotation by the bearings of the wheel without any bearing being arranged between the stator and the rotor.

6. The aircraft wheel according to claim 4, wherein the motor comprises a stator secured to the bushing and a rotor rotatably mounted on the stator by means of bearings, the rotor being constrained to rotate with a disk secured to the sleeve by a securing member such as a dog or pegs dimensioned to break in the event of the force transmitted between the disks and the rotor exceeding a predetermined threshold.

7. A set comprising landing gear having at least one axle provided with an axle nut, and a selection of wheels adapted for mounting on the axle, the selection including:
 a wheel having a hub that receives directly bearings for rotatably mounting it on the axle, such that the bearings are engaged on the axle and are stopped axially and pre-loaded by the axle nut; and
 a wheel according to claim 1, in which the bearing box is engaged on the axle and is held axially by the axle nut;
both wheels having the same bearings, in arrangements that are identical.

\* \* \* \* \*